United States Patent
Glauber et al.

(10) Patent No.: US 11,131,334 B2
(45) Date of Patent: Sep. 28, 2021

(54) PLATE-LIKE COMPONENT WITH A FASTENING DEVICE REACHING THROUGH THE PLATE-LIKE COMPONENT

(71) Applicant: ElringKlinger AG, Dettingen-Erms (DE)

(72) Inventors: Andreas Glauber, Langenzenn (DE); Sergio Moreno-Lechado, Nuremberg (DE)

(73) Assignee: ElringKlinger AG, Dettingen-Erms (DE)

( * ) Notice: Subject to any disclaimer, the term of this patent is extended or adjusted under 35 U.S.C. 154(b) by 622 days.

(21) Appl. No.: 15/770,448

(22) PCT Filed: Sep. 20, 2016

(86) PCT No.: PCT/EP2016/072237
§ 371 (c)(1),
(2) Date: Apr. 23, 2018

(87) PCT Pub. No.: WO2017/067727
PCT Pub. Date: Apr. 27, 2017

(65) Prior Publication Data
US 2018/0313378 A1    Nov. 1, 2018

(30) Foreign Application Priority Data

Oct. 23, 2015  (DE) .......................... 102015118117.7

(51) Int. Cl.
*F16B 5/02*        (2006.01)
(52) U.S. Cl.
CPC .................................. *F16B 5/0241* (2013.01)
(58) Field of Classification Search
CPC ...... F16B 5/0241; F16B 5/025; F16B 5/0258; F16F 1/3732; F16F 1/3735; Y10T 16/05;
(Continued)

(56) References Cited

U.S. PATENT DOCUMENTS 2,212,142 A * 8/1940 Austin .................. F16F 1/3732
                                                         267/141.1
3,079,132 A * 2/1963 Tiegel .................. F16F 1/3732
                                                         165/53

(Continued)

FOREIGN PATENT DOCUMENTS

CN         1205750 A       1/1999
CN       202197010 U       4/2012

(Continued)

OTHER PUBLICATIONS

Specification Translation of JP 2014-148941. Akaha, et al. Mounting Structure of Heat Shielding Cover to Exhaust System Component. Aug. 2, 2014.*

*Primary Examiner* — Josh Skroupa

(57) ABSTRACT

A plate-like component with a fastening device reaching through a fastening opening, the fastening device having:
  a rigid sleeve reaching through the fastening opening, through which a fastening element can be guided,
  The sleeve is surrounded at its outer circumference by at least one damping/decoupling body composed of a wire mesh,
wherein in the region in which it passes through the fastening opening, the damping body has an outer dimension less than the inner dimension of the fastening opening so that an undersizing is produced and in the region outside where it passes through the fastening opening, at least part of the at least one damping body has an outer dimension in a circumference direction which is of such a size that with a maximum sliding within the undersizing, sufficient overlapping is still assured.

8 Claims, 3 Drawing Sheets

(58) Field of Classification Search
CPC .......... Y10T 403/458; Y10T 403/4637; Y10T 403/7047
USPC .............................. 403/228, 243, 365; 16/2.1
See application file for complete search history.

(56) References Cited

U.S. PATENT DOCUMENTS

| | | | |
|---|---|---|---|
| 3,675,881 A | 7/1972 | Caldwell | |
| 4,306,708 A | 12/1981 | Gassaway et al. | |
| 4,711,135 A * | 12/1987 | Horiuchi | B60K 20/04 248/635 |
| 5,683,215 A | 11/1997 | Gaignard et al. | |
| 6,328,513 B1 | 12/2001 | Niwa et al. | |
| 6,561,312 B2 * | 5/2003 | Stanienda | F16B 5/0241 180/300 |
| 6,719,482 B2 * | 4/2004 | Morita | F16B 5/0258 403/408.1 |
| 7,017,891 B2 * | 3/2006 | Izabel | B60S 1/0416 267/141.4 |
| 7,784,585 B2 * | 8/2010 | Greenwood | B21F 45/16 181/211 |
| 8,800,534 B2 * | 8/2014 | Kannan | F02M 61/168 123/469 |
| 9,929,482 B2 * | 3/2018 | Van Ceulen | F16B 5/0241 |
| 2005/0040576 A1 | 2/2005 | Oxenknecht et al. | |
| 2011/0220676 A1 | 9/2011 | Greenwood | |
| 2013/0071203 A1 * | 3/2013 | Hay | F16B 5/0258 411/111 |
| 2013/0336741 A1 * | 12/2013 | Park | B60S 1/0444 411/337 |

FOREIGN PATENT DOCUMENTS

| | | | |
|---|---|---|---|
| DE | 3531549 A1 * | 3/1987 | ............ F16B 5/0258 |
| DE | 10021575 A1 | 11/2001 | |
| DE | 10063812 A1 * | 6/2002 | ............ F16B 5/0258 |
| DE | 102005024864 A1 | 12/2006 | |
| DE | 112006000808 T5 | 4/2008 | |
| DE | 19817289 B4 * | 8/2010 | ............ F16F 1/3732 |
| DE | 202007019243 U1 | 6/2011 | |
| DE | 202013006767 U1 | 9/2014 | |
| EP | 0715086 B1 | 6/1999 | |
| EP | 1491773 A1 * | 12/2004 | ............ F16B 5/0241 |
| EP | 2072380 A1 * | 6/2009 | ............ F16B 5/0241 |
| FR | 2735818 A1 * | 12/1996 | ............ F16F 1/3732 |
| JP | 2014148941 A | 8/2014 | |
| KR | 1020130040289 A | 4/2013 | |

\* cited by examiner

PLATE-LIKE COMPONENT WITH A FASTENING DEVICE REACHING THROUGH THE PLATE-LIKE COMPONENT

FIELD OF THE INVENTION

The invention relates to a plate-like component with a fastening device reaching through the plate-like component according to the preamble to claim 1.

BACKGROUND OF THE INVENTION

A plate-like component of this generic type is known from US 201130220676 A1. It discloses fastening a plate-like component, in particular a heat-shield part, to, a fastening point of another component in a decoupled way by means of a hollow rivet composed of a wire mesh into which a fastening sleeve is inserted.

The rivet composed of wire mesh in this case is inserted through an opening in the plate-like component and, by means of contraction in the longitudinal direction or by compression/upsetting in the longitudinal direction, is riveted to the plate-like component, DE 10 2005 024 864 A1 has disclosed a heat shield, which can be fastened in a decoupled way by means of a double-collared sleeve that is supported against the plate-like component by means of a wave spring washer.

DE 100 21 575 A1 has disclosed a solution that is comparable to DE 10 2005 024 864 A1 in which the decoupling element is embodied in the form of an elastomer ring.

Despite the existence of a large number of known solutions for fastening plate-like components, in particular heat shield parts, in a decoupled way, it is still desirable to enable a plate-like component to be fastened with an improved decoupling system. In particular, a decoupling should be assured even if the fastening device of the plate-like component is slidable.

In a particular embodiment, in addition to the decoupling, it should be possible, to implement a certain, predeterminable degree of damping, e.g. oscillation damping, with a fastening device.

It is also advantageous and desirable to basically disclose a fastening device, which is simply embodied and easy to install—particularly without an excessively high cost for tools and equipment—and can be integrated into a plate-like component.

SUMMARY OF THE INVENTION

According to the invention, a plate-like component with a thickness t is modified by means of a fastening device reaching through the plate-like component via a fastening opening with an inner dimension D, where the fastening device has a rigid sleeve reaching through the fastening opening with a length L>t, through which a fastening element can be guided, and the sleeve is surrounded at its outer circumference by at least one damping/decoupling body composed of a wire mesh, in such a way that in the region in which it passes through the fastening opening, the damping body has an outer dimension of $D_{Dk1}$<D so that an undersizing $U=D-D_{Dk1}$ is produced and in the region outside where it passes through the fastening opening, at least part of the at least one damping body has an outer dimension of $D_{Dk2}$>D+2*U in a circumference direction.

Such an embodiment constitutes the successful creation of a decoupling element, which is accommodated in sliding fashion inside the fastening opening and is nevertheless secured in captive fashion. Despite the provision of a slidability (sliding function), the damping action of the fastening device is assured in both an axial (vertical) and a radial (horizontal) direction, i.e. especially in the plate direction and perpendicular thereto. This is particularly achieved in that the dimensions of the wire mesh and the sleeve are chosen so that in the resulting clearance, a slight clamping of the component occurs. The clamping results in a certain amount of mechanical damping. In order to be able to slide or move the shield element, particularly in order to be able to slide and/or move it inside the opening, it is necessary to overcome clamping forces and/or friction forces between the wire mesh and the plate-like component.

A damping action remains even in the maximum possible sliding position since it is assured that there is no direct contact between the sleeve and the plate-like component.

Only the wire mesh and component come into contact so that no hard, noise-generating impact occurs between the sleeve and component. The wire mesh makes it possible, in every position, to ensure a decoupling and/or damping between the sleeve and the plate-like component, which is usually a shield part. Shims that are (optionally) positioned between the wire mesh and the shield component, i.e. the plate-like component, ensure that the surface of the plate-like component—which is made, for example, of aluminum, steel, or stainless steel—cannot be damaged by movements of the wire mesh. In addition, the shims ensure consistent slidability, i.e. the most constant possible sliding force within the sliding range. This ensures that the wire mesh cannot indent the surface and ensures that surface roughness of the plate-like component does not influence the sliding function or slidability.

The sliding seat function is enabled particularly in that a matching of the dimensions of the individual components of the fastening device is carried out. This is chosen so that there is a surmountable degree of clamping between the plate-like component and the mounted fastening device. The intensity of the clamping is in particular selected so that the fastening device cannot experience a position change (sliding) inside the opening, in any case not due to its own weight, even if the weight force is acting in the radial direction. Preferably, the friction force $F_P$ that has been preset in this way is selected so that even under dynamic loads, e.g. during transport, an unwanted slipping of the fastening device inside the opening is avoided.

The decoupling and damping action in the horizontal and vertical plane, i.e. particularly in the axial direction A and in the radial direction R associated therewith, is enabled by the design of the wire mesh, which shields the entire shield element from the anchoring point. Because the wire mesh completely, surrounds the through opening in the component, i.e. no direct contact is possible between the sleeve and the plate-like component, a decoupling/damping is enabled because of the individual wire loops and because of the interplay between the wire properties and the presence of air cushions between the individual wire loops.

In order to avoid surface damage during operation, a shim, i.e. a slide washer, is optionally positioned between the wire mesh and the plate-like component on each side, which prevents the wire mesh from damaging the surface of the component, which is made of aluminum, for example.

The embodiment according to the invention inherently combines several advantages:

Particularly with regard to its mechanical stability and its decoupling/damping properties, the embodiment according to the invention is thermally resistant, which is very relevant, particularly in shield parts that are exposed to high temperatures.

The embodiment according to the invention features a compact design and a very long mechanical service life.

A maximum slidability of the fastening device inside the through opening can be influenced in a simple way by adjusting the dimensions of the through opening in the plate-like component and the fastening device.

The damping properties of the wire mesh can be adjusted in a simple way by varying the wire mesh with regard to the wire thickness used, the wire hardness, and the manner in which the wire is knitted. Various approaches for adjusting to explicit or specific requirements with only a few attempts are available to the person skilled in the art. In the same way, the plate-like component, in particular its fastening device, can be adjusted to different thicknesses t by simply adjusting the individual parts.

In a preferred embodiment, with proper use of the plate-like component, the at least one damping body is prestressed in an axial direction A relative to support regions surrounding, the fastening, opening so that with the application of force $F_P$ perpendicular to the axial direction (A), which corresponds to the radial direction R, the fastening device is able to slide; the application of force $F_P$ required for the sliding is at least greater than the weight force of the fastening device.

This effectively prevents a rattling or unwanted loose movement of the fastening device in the opening. Furthermore, the application of force $F_P$ required for the movement contributes to the damping of oscillations like a friction damper.

In another preferred embodiment of the invention, the sleeve and/or the at least one damping body is embodied in the shape of a collared sleeve. Such an embodiment offers a suitable resting surface for a fastening element (fastening screw) or a resting surface for the sleeve on the fastening partner component.

Another advantageous measure is to embody the damping body in the form of a—for example cylindrical—damping body sleeve and two damping body rings. Individual parts that are formed in this way are easy to produce.

The damping body can advantageously be composed of a collared sleeve-like damping body and a damping body ring. Such an embodiment makes it possible for the fastening device to be embodied of fewer components.

The rigid sleeve can be advantageously composed of a collared sleeve part and cover plate that is attached to the collared sleeve part. Such an embodiment is likewise easy to produce when it comes to the individual parts and can be simple in terms of the connecting technique, which can be a riveting procedure, for example.

A slide washer serving at least as a shim can be advantageously positioned between the plate-like component and the at least one damping body. The wire mesh of the damping body, in particular its wire loops, can slide against the slide washer in a favorable way. The slide washers are preferably made of steel and constitute a durable sliding surface so that exposed top surfaces in the vicinity of the fastening openings of the plate-like component, which is often made of aluminum, do not become damaged or worn.

The slide washer advantageously has an inner dimension of $D_{GS1}<D$ and an outer dimension of $D_{GS2}>D_{DK2}$. This ensures that the wire mesh of the damping body in the vicinity of the fastening opening does not come into contact with the top, surface of the plate-like component and instead, always comes into contact with, a top surface, of the slide washer regardless of the sliding position of the fastening element relative to the plate-like component.

The damping body can advantageously also be composed of a tangle of wires or a wire netting. In the context of the invention, the term "wire mesh" is to be interpreted as a generic term for structures composed of a tangle of wire, a wire mesh, or a wire netting. Consequently, the term "wire mesh" actually also includes structures knitted out of wire, structures woven out of wire, and structures composed of a tangle of wire.

In order to implement different damping properties or decoupling properties for example in the axial direction A and in the radial direction R, the damping body can be composed of a plurality of damping bodies, which have different compressible ides. It is thus possible, for example, to implement a different damping rate and/or different decoupling properties in the radial direction R than in the axial direction A.

BRIEF DESCRIPTION OF THE DRAWINGS

The invention will be explained in greater detail below by way of example based on the drawings. In the drawings.

DETAILED DESCRIPTION OF THE PREFERRED EMBODIMENTS

Figure 1:
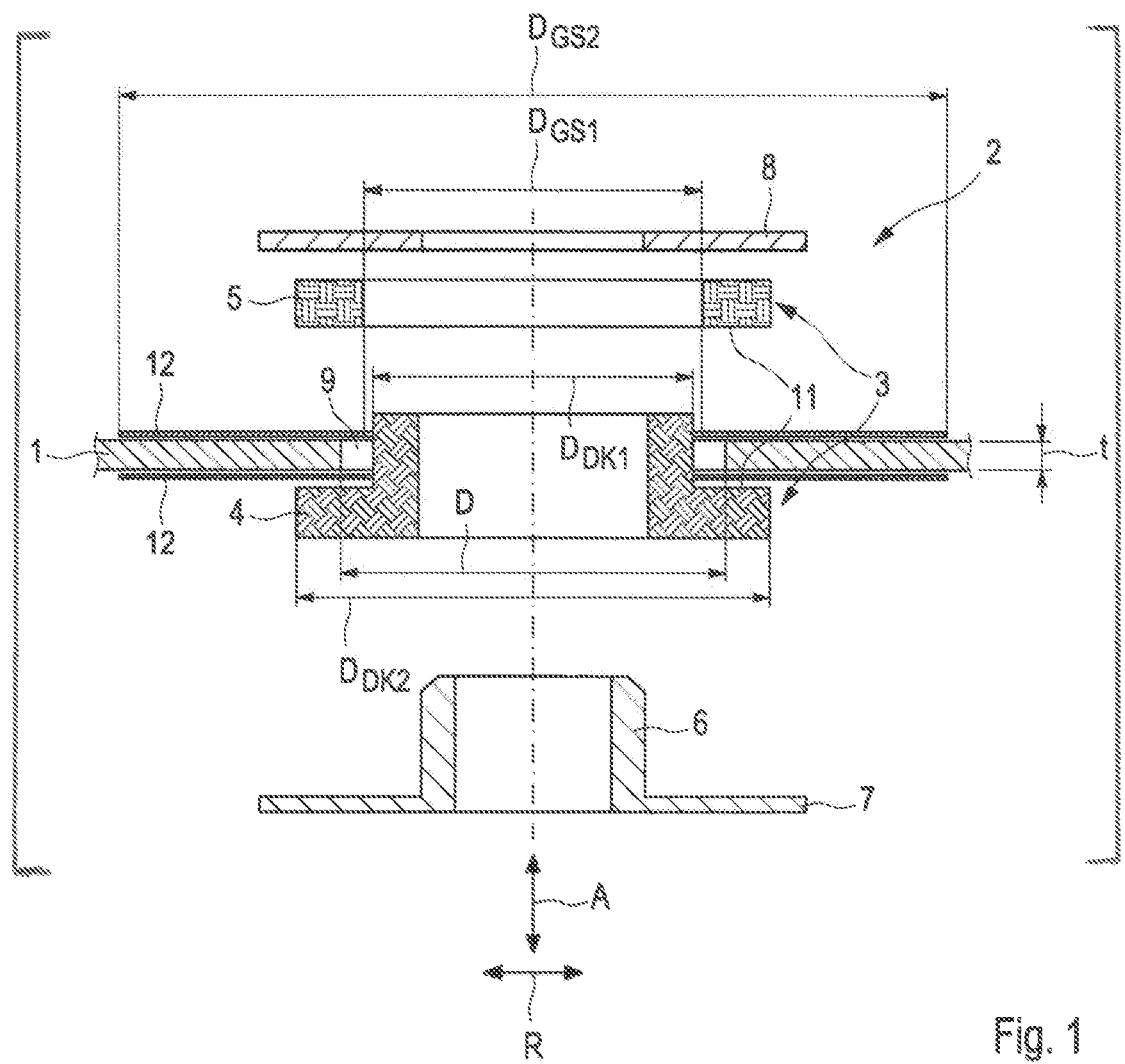
FIG. 1: shows a schematic, exploded view of a first embodiment of the plate-like component according to the invention.

In a first embodiment (FIGS. 1 and 2) of the plate-like component according to the invention 1 having a fastening device 2, a damping body 3 has a multi-part design composed of a collared sleeve part 4 and a damping body ring 5. A sleeve 6 is embodied as a collared sleeve with a circumferential collar 7, which is formed onto a central sleeve part. The sleeve 6 is associated with a cover plate 8. The plate-like component has a fastening opening 9. The fastening opening 9 can, for example, be a round hole, an oblong hole, or a hole with a different geometrical embodiment or contour. The plate-like component 1 has a thickness t; in the case of a multilayer component 1, the thickness t is to be understood as the overall thickness in the immediate vicinity of the fastening opening 9. FIGS. 1 through 5 only show sectional depictions, which do not permit any limitation that the opening 9 must be round. Other sectionally depicted parts can also be round bodies or bodies with other than a round cross-section.

In the respective sectional depictions, the fastening opening 9 has an inner dimension D. The damping/decoupling body 3, i.e. the collared sleeve part 4, in the region in which it reaches through the fastening opening 9, has an outer dimension $D_{Dk1}$, which is smaller than the inner dimension D by an undersizing $U=D-D_{Dk1}$. As a result of this, the damping body 3 can be slid by the dimension U in a radial direction R perpendicular to an axial direction A inside the fastening opening 9. In regions in which the collared sleeve part 4 or the damping body ring 5 is connected to the plate-like component 1 in the axial direction A, the damping body ring 5 or the collared sleeve part 4 has a dimension $D_{Dk2}$, which is of such a size that with a maximum sliding by the dimension U, sufficient overlapping is still assured. The dimension $D_{Dk2}$ thus corresponds to the dimension D+2*U in the respective cross-section.

These embodiment rules of the invention do not have to apply over the entire circumference around the fastening opening 9. It is thus possible, for example, for the damping body 3 to have a jagged or wavy circumference contour so that the damping body 3 is supported only in some regions and, viewed in the circumference direction, there are always gaps between the support regions 11. In such a case, the above rules apply in only some regions in the circumference direction.

It has turned out to be particularly advantageous to position slide washers 12 between the support regions 11, particularly in the vicinity of the fastening opening 9 between the plate-like component 1 and the damping body 3 or more precisely stated, the individual parts thereof, on which slide washers the damping body 3 can slide without contacting the plate-like component 1 directly. The slide washers 12 are preferably made of steel and have a polished surface, for example.

By contrast, in a particular embodiment, the plate-like component is made of aluminum and can be composed of a single layer or be multilayered and in particular, can serve as a shield part for thermal shielding purposes in motor vehicles. The damping body 3 is composed of a wire mesh, a tangle of wire, or a wire netting, in particular with the wire being made of a steel or stainless steel material. The sleeve 6, the collar 7 formed onto it, and the cover plate 8 are composed of a solid steel material. In certain embodiments, particularly in low temperature ranges, an embodiment made of plastic or aluminum is also conceivable.

If the plate-like component 1 is made of aluminum and the damping body is made of a non-stainless steel wire, it can be useful to provide possible contact points between the damping body 3 and the plate-like component 1 with an insulator in order to avoid producing a galvanic element. Otherwise, unwanted corrosion may be produced.

Figure 2:
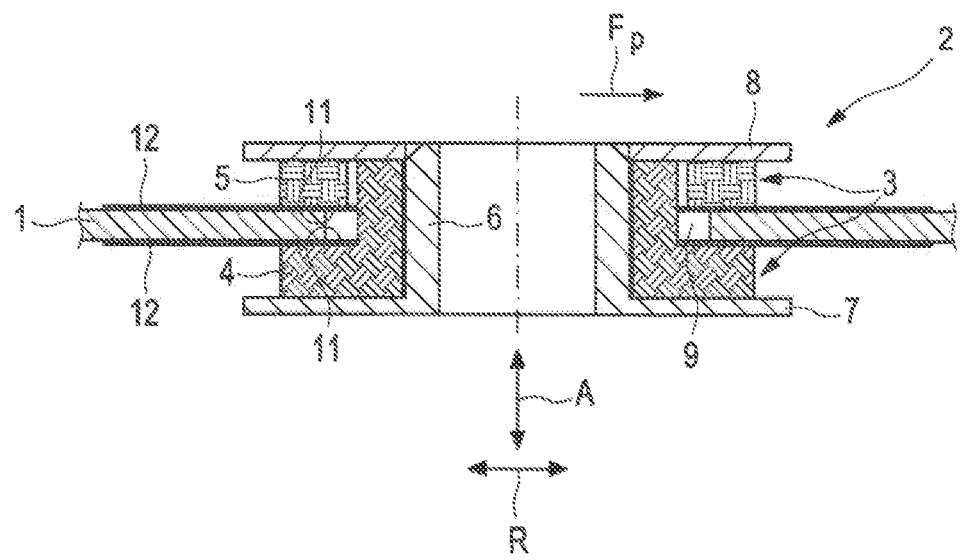
FIG. 2: shows a schematic, assembled view of the embodiment according to FIG. 1.

FIG. 2 shows the embodiment according to FIG. 1 in the assembled state.

Figure 3:
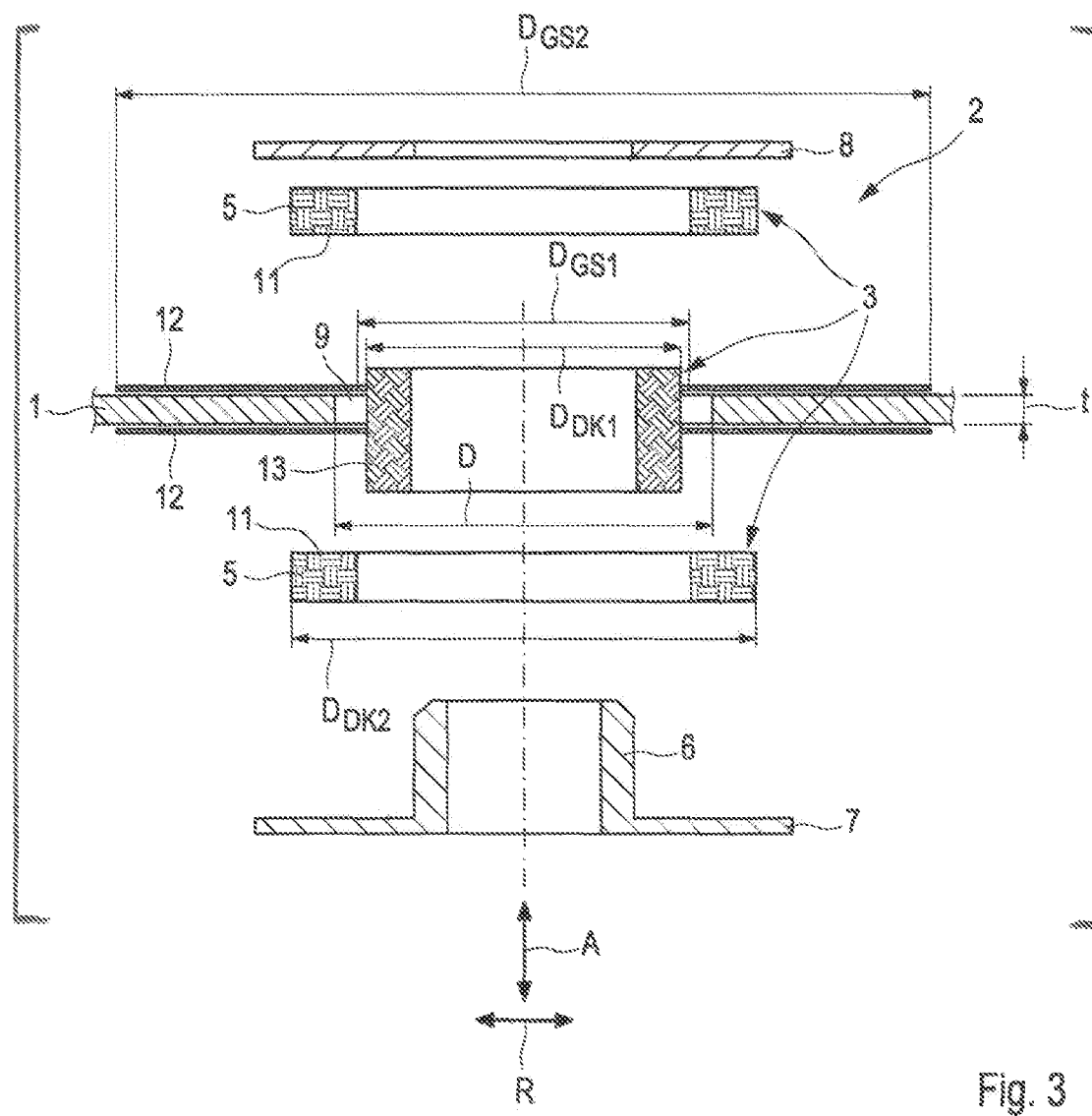
FIG. 3: shows an exploded view of a second embodiment the plate-like component, according to the invention.
Figure 4:
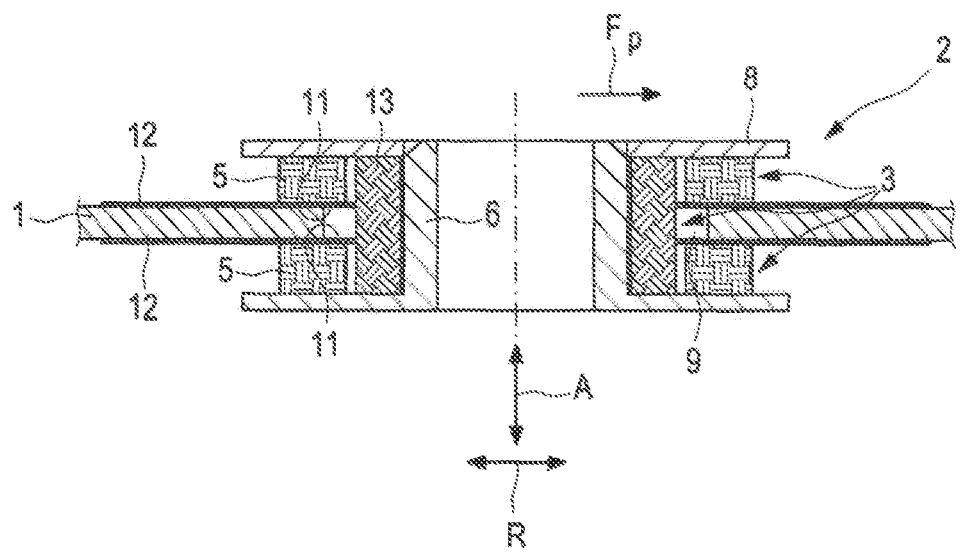
FIG. 4: shows a schematic, assembled view of the embodiment according to FIG. 3.

Another embodiment according to FIGS. 3 and 4 differs from the embodiment of the invention according to FIGS. 1 and 2 only in that the damping body 3 is composed of two damping body rings 5 and a for example cylindrical damping body part 13.

FIG. 3 shows an exploded view of this embodiment. FIG. 4 shows the embodiment according to FIG. 3 in an assembled state.

Figure 5:
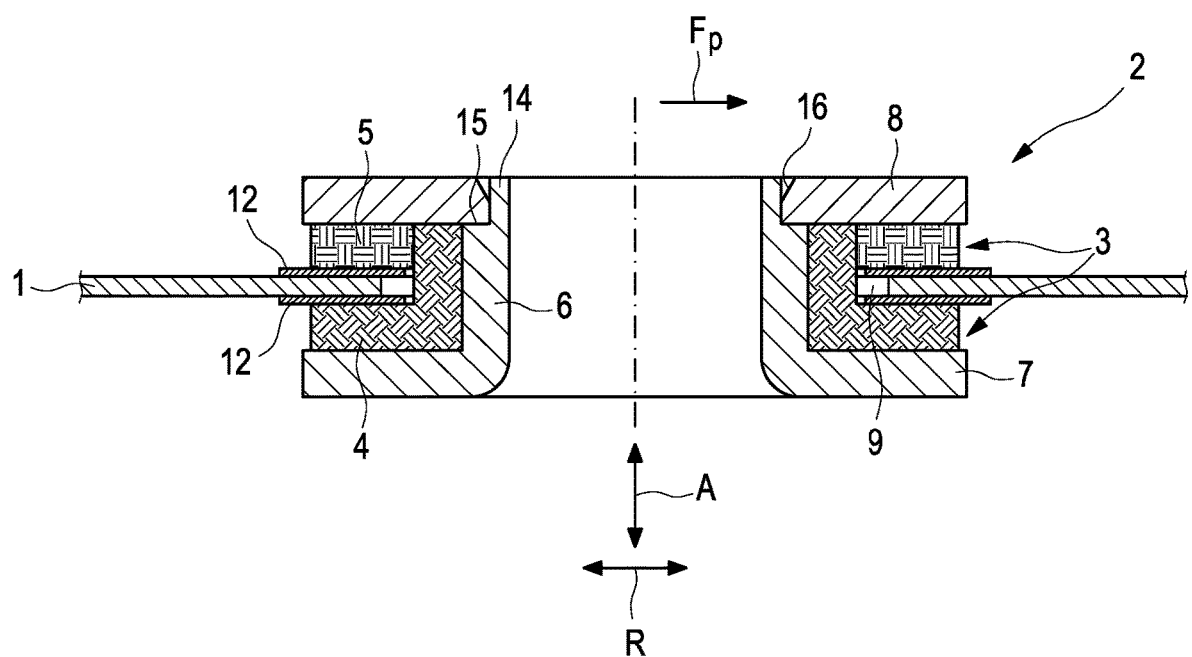
FIG. 5: shows a sectional view of another embodiment of the plate-like component according to the invention.

FIG. 5 shows the embodiment according to FIGS. 1 and 2 in somewhat more detail, revealing that the sleeve 6 has an annular collar 14 on an end oriented in the axial direction A of the cover plate 8, which collar has a reduced wall thickness compared to the sleeve 6. The annular collar 14 is situated radially on the inside so that the cover plate 8 can rest on an annular shoulder 15. The annular collar 14 can be spread radially outward in order to produce the connection to the cover plate 8 and as a result, comes into contact with a bevel 16 of the cover plate 8 so that a form-fitting connection is produced. Such a connection between the cover plate 8 and the sleeve 6 should only be considered as an example. Welds, adhesive connections, press-fit connections, calked connections, or other such connecting techniques can also be used between a cover plate and a sleeve.

The invention claimed is:

1. A plate-like component with a thickness (t) and with a fastening device reaching through the plate-like component through a fastening opening with an inner dimension (D), the fastening device comprising:
    a rigid sleeve with a length L>t reaching through the fastening opening, through which a fastening element can be guided,
    the sleeve is surrounded at its outer circumference by at least one damping/decoupling body composed of a wire mesh, wherein in a region in which the damping body passes through the fastening opening, the damping body has an outer dimension of $D_{Dk1}$<D so that an undersizing U=D−$D_{Dk1}$ is produced and in a region outside where the damping body passes through the fastening opening, at least part of the at least one damping body has an outer dimension of $D_{Dk2}$>D+2*U in a circumference direction,
    wherein the at least one damping body is composed of a first damping body and a second damping body, the component further comprising a first slide washer positioned between a first side of the plate-like component and the first damping body, and a second slide washer positioned between a second side of the plate-like component and the second damping body, and
    wherein with proper use, the at least one damping body is prestressed in an axial direction (A) relative to support regions surrounding the fastening opening so that with the application of force ($F_p$) perpendicular to the axial direction (A) (=radial direction (R)), the fastening device is able to slide; the application of force ($F_p$) is at least greater than a weight force of the fastening device.

2. The component according to claim 1, wherein the sleeve and/or one of the first damping body and the second damping body is/are embodied in the shape of a collared sleeve.

3. The component according to claim 1, wherein the at least one damping body is composed of three separate components, namely a cylindrical damping body sleeve, the first damping body, and the second damping body.

4. The component according to claim 1, wherein one of the first damping body and the second damping body is composed of a collared sleeve-like damping body and the other of the first damping body and the second damping body is a damping body ring.

5. The component according to claim 1, wherein the rigid sleeve is composed of a collared sleeve part and a cover plate that is attached to the collared sleeve part.

6. The component according to claim 1, wherein the first and second slide washers each have an inner dimension smaller than an inner dimension of the fastening opening ($D_{GS1}$<D).

7. The component according to claim 1, wherein the at least one damping body is composed of a plurality of damping bodies, which have different compressibilities.

8. The component according to claim 1, wherein the at least one damping body is composed of a plurality of damping bodies, wherein the damping bodies have a different compressibility in an axial direction (A) than in a radial direction (R).

* * * * *